(12) United States Patent
Clare et al.

(10) Patent No.: US 6,277,776 B1
(45) Date of Patent: Aug. 21, 2001

(54) FLUOROPHOSPHATE SPLICE GLASS FOR JOINING OPTICAL FIBERS

(75) Inventors: Alexis Clare, Alfred, NY (US); Wesley King, Southbridge; Ian Grainge Clarke, Amherst, both of MA (US)

(73) Assignee: IPG Photonics Corporation, Sturbridge, MA (US)

( * ) Notice: Subject to any disclaimer, the term of this patent is extended or adjusted under 35 U.S.C. 154(b) by 0 days.

(21) Appl. No.: 09/337,470

(22) Filed: Jun. 21, 1999

Related U.S. Application Data

(60) Provisional application No. 60/090,150, filed on Jun. 22, 1998.

(51) Int. Cl.[7] ................................................ C03C 3/247
(52) U.S. Cl. ............................ 501/44; 501/900; 501/45
(58) Field of Search ................................. 501/40, 44, 45, 501/900

(56) References Cited

U.S. PATENT DOCUMENTS

| | | | |
|---|---|---|---|
| 2,723,203 | * 11/1955 | Weissenberg et al. | 501/44 |
| 3,656,976 | * 4/1972 | Izumitani et al. | 501/44 |
| 4,362,819 | * 12/1982 | Olszewski et al. | 501/44 |
| 4,920,081 | * 4/1990 | Beall et al. | 501/44 |

FOREIGN PATENT DOCUMENTS 39 07 513 * 9/1990 (DE).

* cited by examiner

*Primary Examiner*—David R. Sample
(74) *Attorney, Agent, or Firm*—Dykema Gossett PLLC

(57) ABSTRACT

A low temperature fluorophosphate glass useful for joining single-mode fluoride and silica optical fibers includes 5 to 7 mol % $InF_3$, 20 to 35 mol % $PbF_2$ and 57.5 to 75 mol % $P_2O_5$. An alkali for maintaining a low glass transition temperature can be included. Up to 25% (glass molar basis) of the $P_2O_5$ can be replaced by PbO.

7 Claims, 2 Drawing Sheets

FLUOROPHOSPHATE SPLICE GLASS FOR JOINING OPTICAL FIBERS

CROSS REFERENCE TO RELATED APPLICATION

This application is related to Provisional Application No. 60/090,150 filed on Jun. 22, 1998.

BACKGROUND OF THE INVENTION

1. Field of the Invention

The present invention relates to materials that can be used to splice or connect the ends of optical glass fibers of differing compositions.

2. The Prior Art

Optical glass fibers and devices used in the telecommunications industry traditionally have been made of silica based compositions. Fluoride glasses, and notably those based upon fluoro-zirconates, have also been developed for telecommunications applications. It has been demonstrated that these materials possess fundamental advantages over silica-based materials for certain applications. Currently, the most commercially promising application for fluoride glasses involves their use as a host for Praseodymium (Pr) in fiber-based optical amplifiers.

Telecommunication devices based upon fluoride glass fibers must be efficiently likable to single mode silica glass fiber, the standard fiber for telecommunications. However, there are fundamental differences between silica and fluoride glasses which tend to make them incompatible in an optical system or assembly. Fluoride glasses typically exhibit glass transition ($T_g$) values between 200° C. and 300° C. and exhibit onset of devitrification (crystallization) at temperatures usually above 100° C. above $T_g$. In contrast, silica possesses a $T_g$ of 1000° C. to 1100° C. and a marked resistance to devitrification. Such a large difference in maximum usable temperature renders the common fusion splice method for connecting silica fibers to one another impractical for mating silica and fluoride fibers. It is imperative, therefore, to have a low temperature fixative for the splice between the fluoride and silica fibers.

Commercially available, organic fixatives are low temperature but tend to degrade under the power levels required for device operation and typically are prone to moisture absorption. Such behaviors make these materials less than appealing for long life telecommunication applications involving high laser power levels. In addition, many organic fixatives absorb strongly in the blue region of the visible spectrum, and a significant amount of blue, up-converted light is generated in the Pr-doped fluoride fiber amplifier.

SUMMARY OF THE INVENTION

The object of this invention is to provide a splicing material which can be effectively used to splice single-mode fluoride and silica optical fibers.

The foregoing object is achieved with inorganic, low temperature fluorophosphate glass compositions that include a non-zero amount up to 7.5 mol % $InF_3$, a non-zero amount up to 35 mol % $PbF_2$, remainder $P_2O_5$, and more specifically to glass compositions that include 5 to 7.5 mol % $InF_3$, 20 to 35 mol % $PbF_2$ and 57.5 to 75 mol % $P_2O_5$. Such glasses can be successfully used to effect optical splices between single-mode and silica optical fibers.

The invention will be better understood by reference to the accompanying drawings taken in conjunction with the following discussion.

DETAILED DESCRIPTION OF THE PREFERRED EMBODIMENT

Figure 1:
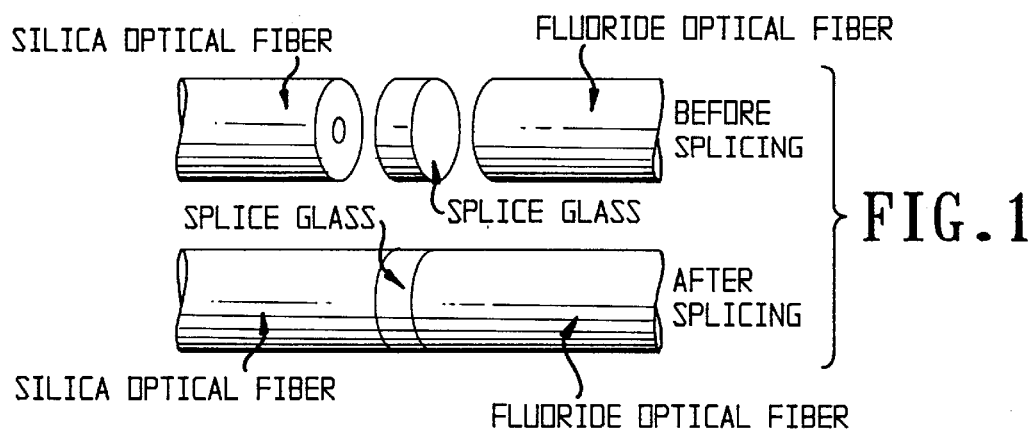
FIG. 1 schematically depicts connecting a silica optical fiber to a fluoride optical fiber using a glass splice.

The connection of a silica optical fiber to a fluoride optical fiber using a glass according to the invention is shown schematically in FIG. 1. Glasses according to the invention comprise a mixture of $InF_3$, $PbF_2$, and $P_2O_5$, and more specifically a non-zero amount up to 7.5 mol % $InF_3$, a non-zero amount up to 35 mol % $PbF_2$, with the remainder being $P_2O_5$. Preferred glass compositions contain, on a molar basis, at least 5% and no greater than 7.5% $InF_3$, the lower limit being necessary to inhibit reduction of the lead and the upper limit to maintain acceptable glass stability against devitrification. Additionally, preferred glasses contain 20 to 35 mol % $PbF_2$. At a lower $PbF_2$ content, the durability suffers and the glass is not robust. At levels above 35 mol %, the $PbF_2$ increases the $T_g$ too much, necessitating higher splicing temperature, which leads to damage of the fluoride fiber during splicing. In each case, after the $InF_3$ and $PbF_2$ components are added, the remainder (between 57.5 to 75 mol %) is made up of $P_2O_5$. For glass compositions in the aforementioned range, up to 25% (glass molar basis) of the $PbF_2$ portion may be replaced with lead oxide (PbO), without degrading glass stability. These fluorophosphate glasses possess a chemical affinity for both fluoride and silica glass fibers, allowing a strong chemical bond to be formed between them. The phosphate component provides a convenient, low temperature base glass matrix, while the lead component (fluoride or oxide) is mutually soluble in both silicates and fluorides and encourages bonding. Incorporation of the indium fluoride provides an in-situ oxidant for the lead, which would otherwise reduce to elemental lead, and also gives a slight improvement in chemical durability.

Figure 2:
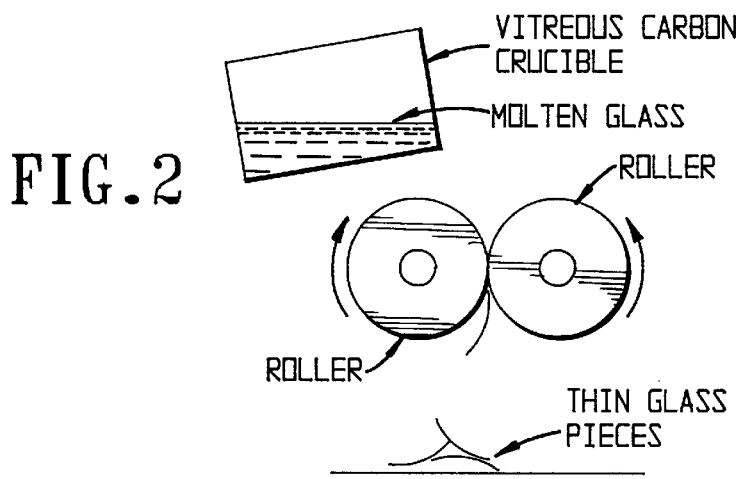
FIG. 2 depicts the formation of glass splices according to the invention using a roller quenching technique.

The glasses are made by intimately mixing the appropriate weights of ammonium dihydrogen phosphate, lead fluoride or oxide and indium fluoride in a vitreous carbon crucible. The glasses are melted no less than 10 and no greater than 30 minutes at 530° C.–550° C., depending on subsequent treatment. Longer melting times lead to loss of phosphate by volatilization, and shorter melting times do not ensure complete melting and glass uniformity. Glasses may be cast onto a heated brass plate or may be rapidly quenched between rotating metal rollers to obtain thin ribbons for splicing, as is shown in FIG. 2. Higher temperature are needed for roller quenching to ensure low viscosity during the casting process. Small diameter rods or fibers may also be drawn or spun from the melt. Upon reheating, the glass attaches easily to both the oxide and fluoride glass fibers, thereby forming a strong, optical quality bond. The glass splice is transparent and robust at the designated wavelengths of interest. Splices made using these glasses do not degrade with time, moderate temperature cycling (0–70° C.) or limited humidity.

Figure 5:
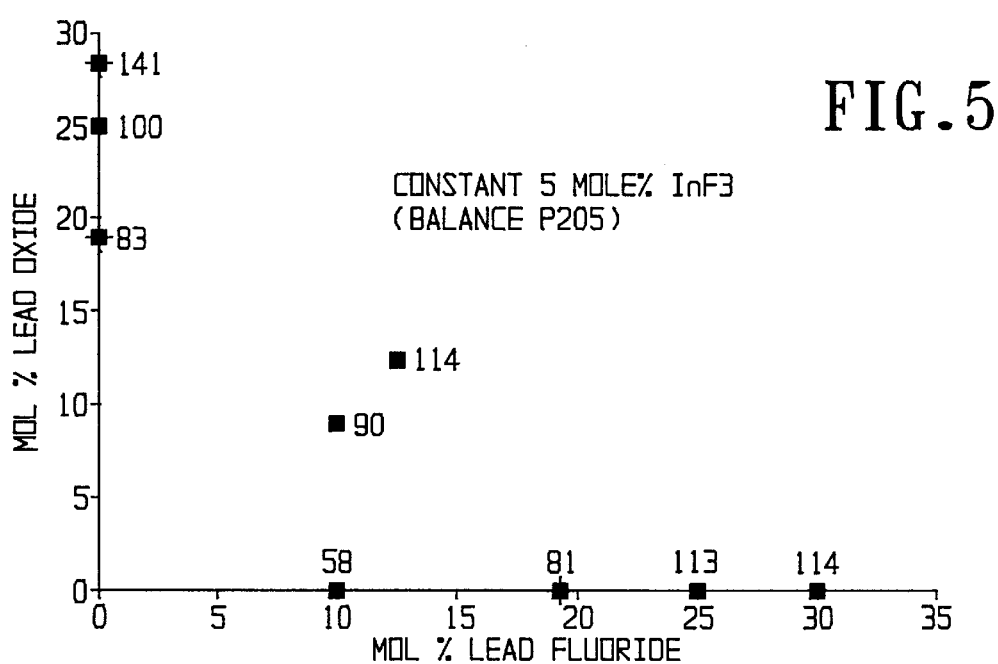
FIG. 5 shows glass transition temperatures for glasses according to this invention.
Figure 3:
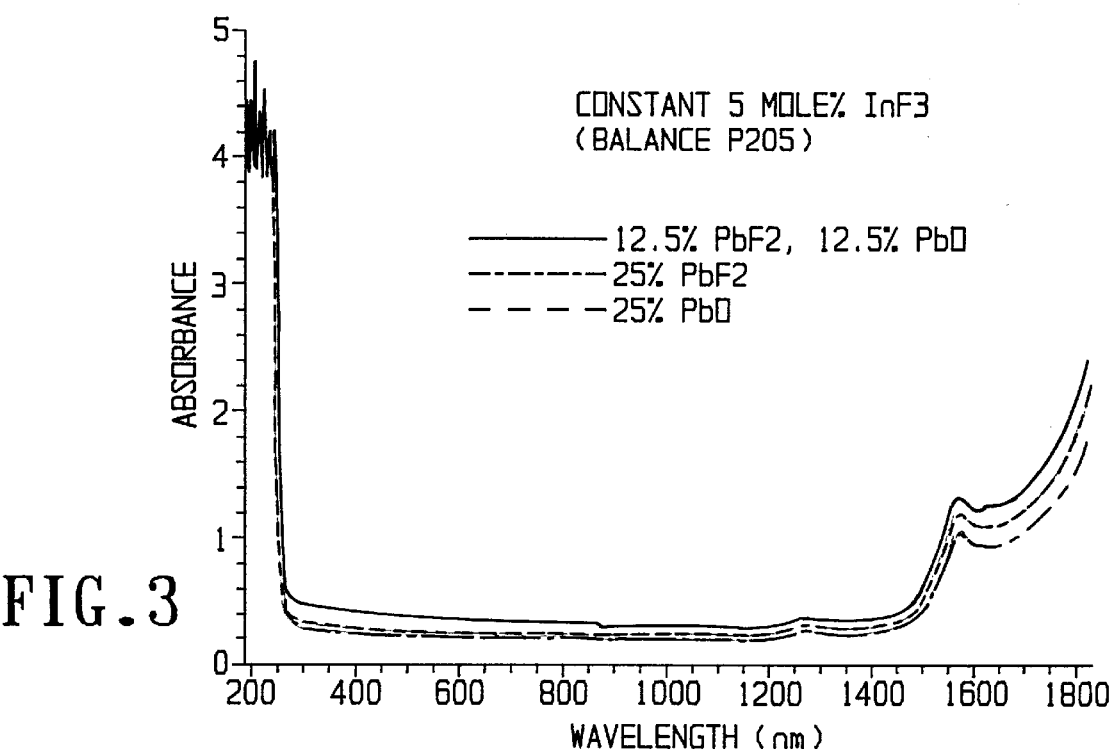
FIGS. 3 and 4 show typical absorption spectra for glasses according to the invention.
Figure 4:
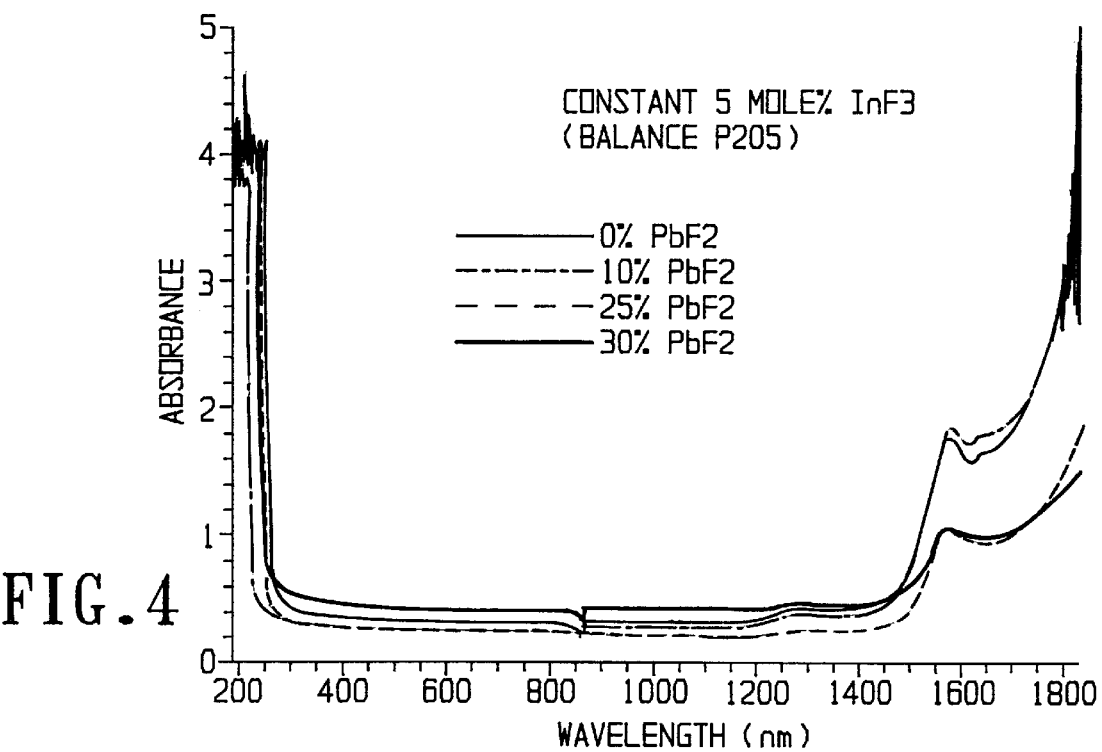

Within the described family of glasses, the composition may be varied to tailor the specific glass properties. These glasses are transparent over a broad spectral range and exhibit minimal absorption at the wavelengths of interest for Pr-doped fluoride fiber amplifiers. Typical absorption spectra are displayed in FIGS. 3 and 4. In general, higher lead, lower phosphate compositions increase $T_g$ but also improve transmission at longer wavelengths. The onset $T_g$ values range from 80° C. to 160° C. Some glass transition temperatures are shown in FIG. 5 and are low enough to enable successful splicing between silica and fluoride fibers without damaging the low-melting fluoride. Thermal expansion values are of the order of $170 \times 10^{-7}$ and are between that of silica ($7 \times 10^{-7}$) and the fluoride glass ($180 \times 10^{-7}$), which is necessary to bond the two dissimilar materials together. These glasses are less susceptible to degradation and failure under high laser power than organic splice candidates. The indium fluoride acts as an in-situ oxidant ($In^{3+} \rightarrow In^{2+}$) for the lead so that it will not be reduced to metallic lead, as well as providing a limited improvement in chemical durability. The presence of elemental lead in the path of a laser would be disastrous. Lead phosphate glasses with indium have been made previously for optical components, where indium oxide was added for chemical stability. Lead tin fluorophosphates have been made for optical components containing organic dyes. Indium fluoride has been used as an in-situ oxidant in fluorozirconate glasses.

In the splice process, the glass is melted onto the end of the silica fiber and then subsequently heated to join it to the end of the fluoride fiber. It is important at this point to have a reasonably low viscosity in the liquid sate to enable easy alignment of the fiber cores. To facilitate this alkali may be added to the compositions. In order to maintain a low glass transition temperature, the alkali may be added to the 25 mol % $PbF_2$; 70 mol % $P_2O_5$; 5 mol % $InF_3$ up to 10 mol %, replacing 5 mol % $PbF_2$ and 5 mol % $P_2O_5$. This can be carried out using LiF, NaF or KF, with NaF being preferred. However, it is believed that alkali leaching may occur if the glass is subjected to excessive moisture.

An exemplary splice glass used in manufacturing has a molar composition as follows:

70% $P_2O_5$, 25% $PbF_2$, 5% $InF_3$

The $P_2O_5$ is added as ammonium dihydrogen phosphate $NH_4H_2PO_4$. This composition adheres well to both silica and fluoride (ZBLAN) fibers and withstands optical power densities of several megaWatts per square centimeter present in an optical amplifier.

While the invention has now been described in detail, modifications there can be made and still fall within the scope of the appended claims. Example

What is claimed is:

1. A fluorophosphate glass for use as a splice glass in joining optical fibers which consists essentially of a non-zero amount up to 7.5 mol % $InF_3$, a non-zero amount up to 35 mol % $PbF_2$ and 57.5 to 75 mol % $P_2O_5$.

2. A fluorophosphate glass according to claim 1, consisting essentially of 5 to 7.5 mol % $InF_3$, 20 to 35 mol % $PbF_2$ and 57.5 to 75 mol % $P_2O_5$.

3. A fluorophosphate glass according to claim 2, wherein up to 25% on a molar basis of $PbF_2$ is replaced by PbO.

4. A fluorophosphate glass according to claim 1, including up to 10 mol % alkali.

5. A fluorophosphate glass according to claim 4, wherein said alkali is selected from the group consisting of LiF, NaF and KF.

6. A fluorophosphate glass according to claim 1, consisting essentially of 5 mol % $InF_3$, 25 to 30 mol % $PbF_2$, balance $P_2O_5$.

7. A fluorophosphate glass according to claim 1 consisting essentially of:

70% $P_2O_5$, 25% $PbF_2$, and 5% $InF_3$.

* * * * *